(12) United States Patent
Lin et al.

(10) Patent No.: US 11,551,085 B2
(45) Date of Patent: Jan. 10, 2023

(54) METHOD, DEVICE, AND COMPUTER PROGRAM PRODUCT FOR ERROR EVALUATION

(71) Applicant: EMC IP Holding Company LLC, Hopkinton, MA (US)

(72) Inventors: Fangyuan Lin, Chengdu (CN); Xiaohui Wang, Chengdu (CN); Hui Li, Chengdu (CN); Li Yuan, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 403 days.

(21) Appl. No.: 16/793,642

(22) Filed: Feb. 18, 2020

(65) Prior Publication Data

US 2021/0117779 A1 Apr. 22, 2021

(30) Foreign Application Priority Data

Oct. 18, 2019 (CN) .......................... 201910992509.1

(51) Int. Cl.

| | |
|---|---|
| *G06V 10/82* | (2022.01) |
| *G06N 3/08* | (2006.01) |
| *G06F 16/17* | (2019.01) |
| *G06K 9/62* | (2022.01) |
| *G06N 3/04* | (2006.01) |

(Continued)

(52) U.S. Cl.
CPC ............ *G06N 3/08* (2013.01); *G06F 11/1024* (2013.01); *G06F 16/1734* (2019.01); *G06F 21/60* (2013.01); *G06K 9/6232* (2013.01); *G06N 3/04* (2013.01); *G06V 10/7715* (2022.01); *G06V 10/82* (2022.01)

(58) Field of Classification Search
CPC .. G06F 16/1734; G06K 9/6232; G06K 9/626; G06K 9/6271; G06N 3/04; G06N 3/08; G06N 3/0445; G06N 3/0454; G06V 10/82

See application file for complete search history.

(56) References Cited

U.S. PATENT DOCUMENTS

| | | | | |
|---|---|---|---|---|
| 10,218,729 | B2* | 2/2019 | Gay | .................... H04L 63/1425 |
| 10,574,512 | B1* | 2/2020 | Mermoud | ........... H04L 41/5019 |

(Continued)

*Primary Examiner* — Ian L Lemieux (74) *Attorney, Agent, or Firm* — Womble Bond Dickinson (US) LLP (57) ABSTRACT

Embodiments of the present disclosure provide a method, device, and computer program product for error evaluation. A method for error evaluation comprises in accordance with a determination that an error occurs in a data protection system, obtaining context information related to an operation of the data protection system; determining, based on the context information and using a trained deep learning model, a type of the error in the data protection system from a plurality of predetermined types, the deep learning model being trained based on training context information and a label on a ground-truth type of an error associated with the training context information; and providing the determined type of the error in the data protection system. In this way, it is possible to achieve automatic classification of errors in the data protection system, thereby improving the efficiency in error classification and saving the operation costs. Therefore, more rapid and more accurate measures can be taken to handle the errors.

20 Claims, 5 Drawing Sheets

(51) Int. Cl.
*G06F 11/10* (2006.01)
*G06F 21/60* (2013.01)
*G06V 10/77* (2022.01)

(56) References Cited

U.S. PATENT DOCUMENTS

| | | | |
|---|---|---|---|
| 11,010,233 B1* | 5/2021 | Golden | G06F 21/64 |
| 11,061,780 B1* | 7/2021 | Marelas | G06F 11/1451 |
| 2018/0248904 A1* | 8/2018 | Villella | G06N 7/005 |
| 2019/0034623 A1* | 1/2019 | Lowry | G06F 16/1734 |
| 2019/0228296 A1* | 7/2019 | Gefen | G06F 11/079 |
| 2019/0260787 A1* | 8/2019 | Zou | H04L 41/16 |
| 2019/0362245 A1* | 11/2019 | Buda | G06N 3/08 |
| 2020/0193234 A1* | 6/2020 | Pai | G06K 9/6262 |

* cited by examiner

METHOD, DEVICE, AND COMPUTER PROGRAM PRODUCT FOR ERROR EVALUATION

CROSS-REFERENCE TO RELATED APPLICATION

This patent application claims priority, under 35 U.S.C. § 119, of Chinese Patent Application No. 201910992509.1, filed Oct. 18, 2019, which is incorporated by reference herein in its entirety.

FIELD

The present disclosure generally relates to computer technologies and more specifically, to a method, device and computer program product for error evaluation.

BACKGROUND

Computer data are important to the today's organization and the attention is mainly paid to data protection from the disaster. With the development of solid-state memory, the costs of the memories are not an important issue and the organization can afford a system with storage and processing in megabyte. Consequently, there are growing demands on data storage and data protection.

Data protection is critical to ensure data safety, integrity, and/or consistency, which is of great importance in an environment such as a data center. The common data protection solution includes, for example, data duplication, backup, dump, and the like. A data protection system may be built for storing protected data. The data protection system may use data duplication by creating a backup for production site data of the organization on a backup storage system and updating the backup as it changes. Typically, a data protection system is complicated in which errors often occur. Therefore, corresponding measures are required when the errors occur.

SUMMARY

Embodiments of the present disclosure provide an improved solution for error evaluation in a data protection system.

In a first aspect of the present disclosure, there is provided a method for error evaluation. The method comprises in accordance with a determination that an error occurs in a data protection system, obtaining context information related to an operation of the data protection system; determining, based on the context information and using a trained deep learning model, a type of the error in the data protection system from a plurality of predetermined types, the deep learning model being trained based on training context information and a label on a ground-truth type of an error associated with the training context information; and providing the determined type of the error in the data protection system.

In a second aspect of the present disclosure, there is provided an electronic device. The electronic device comprises: a processor; and a memory coupled to the processor, the memory storing instructions to be executed, the instructions, when executed by the processor, causing the electronic device to perform acts of: in accordance with a determination that an error occurs in a data protection system, obtaining context information related to an operation of the data protection system; determining, based on the context information and using a trained deep learning model, a type of the error in the data protection system from a plurality of predetermined types, the deep learning model being trained based on training context information and a label on a ground-truth type of an error associated with the training context information; and providing the determined type of the error in the data protection system.

In a third aspect of the present disclosure, there is provided a computer program product being tangibly stored on a computer-readable medium and comprising computer-executable instructions which, when executed, cause the processor to perform the method of the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become apparent through the detailed description of example embodiments of the present disclosure with reference to the accompanying drawings where the same reference symbols generally refer to the same elements in the example embodiments of the present disclosure.

DETAILED DESCRIPTION OF EMBODIMENTS

Principles of the present disclosure will now be described with reference to several example embodiments illustrated in the drawings. Although preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like can represent different or the same objects. Other definitions, either explicit or implicit, may be included below.

Since a data protection system is complicate and disk array read and write are performed frequently therein, various errors may occur in the data protection system. In use, a user of the data protection system may report an error when encountering an operation problem. Typically, from the perspective of system management, different types of errors need different solutions or different technologies. For example, errors involving system parameter configuration, machine restart, and the like, are usually solved by technical support staff, while errors involving software logic and the like require developers to participate in error correction.

Nowadays, error classification in a data protection system is manually performed by technical engineers. Technical engineers determine a type of the error by analyzing the current system status according to their expertise and then provide a subsequent solution. However, such manual operation is labor-intensive and time-consuming, having low efficiency. In addition, since individual technical engineers have limited knowledge, the error determination has low accuracy or high deviation or will take a significant human communication cost to make an accurate decision.

According to embodiments of the present disclosure, there is provided an improved solution for error evaluation. In this solution, by training a deep learning model, a specific type of an error in a data protection system is determined from a plurality of predetermined types based on context information related to an operation of the data protection system when the error occurs therein. The deep learning model is trained based on training context information and a label on a ground-truth error type associated with the context information of training. In this way, it is possible to achieve automatic classification of errors in the data protection system, thereby improving the efficiency in error classification and saving the operation costs. Therefore, more rapid and more accurate measures can be taken to handle the errors. In addition, the learning capability of the deep learning model can ensure stable error evaluation efficiency and accuracy, and keep the possibility of continuous improvement.

Figure 1:
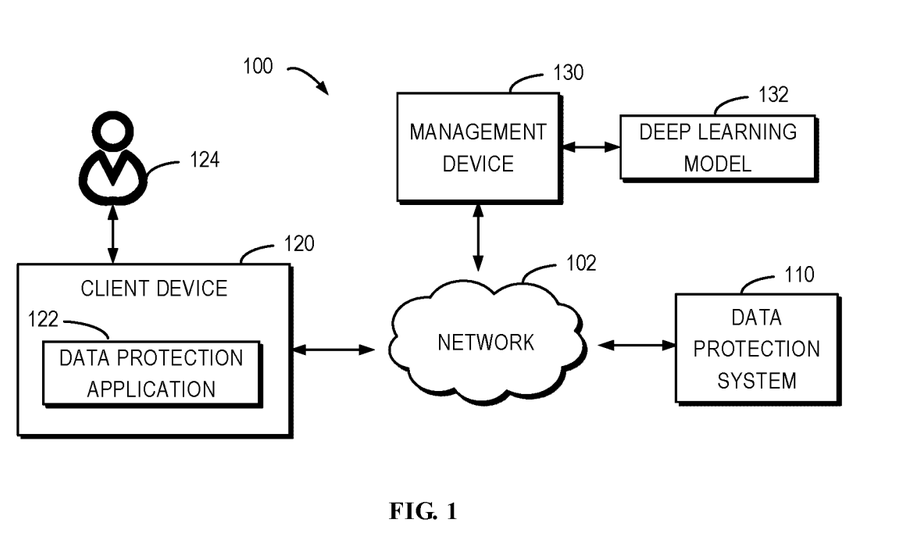
FIG. 1 illustrates a block diagram of an environment in which embodiments of the present disclosure can be implemented.

FIG. 1 illustrates a schematic diagram of an environment 100 in which embodiments of the present disclosure can be implemented. It would be appreciated that architecture and functionalities in the environment 100 are provided as an example, without suggesting any limitation to the scope of the present disclosure. The embodiments of the present disclosure are also applicable to environments with different structures and/or different functionalities that include a data protection system.

As shown in FIG. 1, in the environment 100, a data protection system 110 performs, in response to requests from one or more client devices 120, operations related to data protection, such as data copy, data backup, data recovery, and the like. The client device 120 may run thereon a data protection application 122 for operation by a user 124 of the client device 120. Through the data protection application 122, the user 124 can perform operations on data to be protected, customize some configurations of the data protection system 110, send requests related to data protection, and the like, through the client device 120. The client device 120 may communicate with the data protection system 110 via a network 102. The network 102 may be a wireless network, a wired network, or a combination thereof. It would be appreciated that although FIG. 1 illustrates a single client device and a single data protection system, there may be a plurality of client devices in the environment 100 to access to a single data protection system, or there may be a plurality of client devices and a plurality of data protection systems corresponding to the plurality of client devices, respectively, in the environment 100.

The data protection system 110 may include one or more storage device nodes, one or more computing device nodes, and the like, to provide storage of the protected data and the computing capability for a data protection scheme. These device nodes may communicate with one another via wired and/or wireless connections, to implement distributed control and management. In some embodiments, the data protection system 110 may be implemented in a cloud environment. Examples of data protection provided by the data protection system 110 include, but are not limited to, duplicated versions at respective times, file archiving in a storage medium such as a magnetic tape, disk or the like, and both duplication and archiving. It would be appreciated that data protection in any other form and/or combination can also be applicable to embodiments of the present disclosure, and duplicated versions at times and file archiving are only simple examples.

Typically, some errors may occur in the data protection system 110, resulting in the client device 120 failing to normally implement data protection. Since there may be various causes of errors, different measures may be needed in response to different types of errors. According to embodiments of the present disclosure, the management device 130 in the environment 100 is configured to evaluate errors of the data protection system 110. In particular, the management device 130 utilizes a deep learning model 132 to perform the error evaluation. In some embodiments, the management device 130 may be integrated in the data protection system 110.

As used herein, the term "deep learning model" may also be referred to as "leaning model," "learning network," "network model," or "model." "Neural network" or "neural network model" is a deep machine learning model. In general, a deep learning model receives input information and performs prediction based on the input information.

Deep learning may be divided mainly into three stages, including a training stage, a test stage, and an application stage. At the training stage, a given deep learning model may be trained using a lot of training samples, and the training is iterated until the deep learning model can consistently obtain reasoning from the training samples similarly to human beings. It may be considered that through training, the deep learning model can learn mappings or associations between inputs and outputs from the training data. After the training, a parameter set of the deep learning model is determined. At the test stage, test samples may be used to test the trained deep learning model, thereby determining the performance of the deep learning mode. At the application stage, the machine learning model may process real-life input information based on the parameter set obtained from the training, so as to provide a corresponding output.

Figure 2:
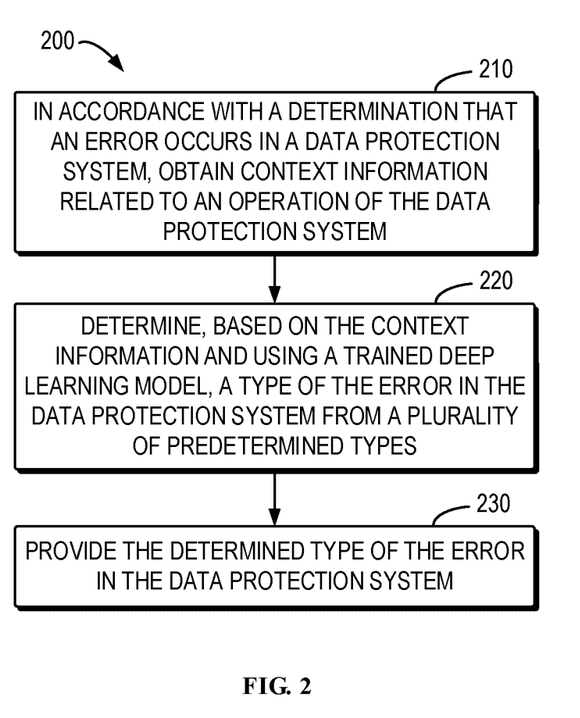
FIG. 2 illustrates a flowchart of a method for error evaluation according to some embodiments of the present disclosure.

Reference will be made hereinafter to the drawings to illustrate how the management device 130 utilizes the deep learning model 132 to perform error evaluation. FIG. 2 illustrates a flowchart of a process 200 of error evaluation according to some embodiments of the present disclosure. The process 200 may be implemented by the management device 130.

At 210, in accordance with a determination that an error occurs in the data protection system 110, the management device 130 obtains context information related to an operation of the data protection system 110. Occurrence of an error in the data protection system 110 may be determined through automatic detection means or may be determined from content reported by the client device 120. If it is determined that there may be an error, the management device 130 obtains the context information to perform error evaluation.

The context information related to an operation of the data protection system 110 may include various types of information, particularly includes information that can reflect an operational status or operational event of the data protection system 110. In some embodiments, the context information may include log information of the data protection system 110. For an operation of the data protection system 110, respective log information is typically stored. The log information is generally sequential data, which records various types of events occurred in the data protection system 110 in a temporal order. These events may be indicated by respective event codes. Every time when an event occurs at a certain time, the log information includes a respective event code corresponding to the time and the occurrence time of the event. Examples of events to be recorded may include, but are not limited to, system boot, user login, reception of a data packet at a connection port, transmission of a data packet at a connection port, and the like. When an error occurs in the system, the unreasonable or error event occurred can be determined by analyzing the log information, such that the error type can be determined. The management device 130 may acquire the log information of the data protection system 110 from a log database.

In some embodiments, the context information may additionally or alternatively include screenshot information on the error, for example, a screenshot of a user interface (e.g., a Graphical User Interface (GUI)) of the client device 120 of the data protection system 110 when the error occurs. The screenshot information may reflect visually one or more aspects of the error. In some cases, the screenshot information may act as a supplementation to or otherwise present the context of the operation, which is similar to the log information.

In some embodiments, the context information may additionally or alternatively include system status information of the data protection system 110, such as operating system data, application system data, and so on in the data protection system 110. The system status information may indicate one or more aspects of the current operational status of the data protection system 110. As an example only, Table 1 lists one or more aspects of the system status information that may be collected for assistance in error evaluation.

TABLE 1

Example of System Status Information

| System status information | Relevant description |
| --- | --- |
| Usage rate of total storage space (%) | indicating usage of a total storage space of the data protection system 110 |
| Usage rate of storage capacity (%) | indicating usage of a storage capacity allocated to a user in the total storage space of the data protection system 110 |
| Usage rate of operating system (%) | indicating usage of the operating system in the data protection system 110 |
| Usage rate of memory space (%) | indicating usage of the memory space (or RAM space) in the data protection system 110 |
| Text system status | indicating a current operational status of a file system (e.g., data storage architecture abstracted from the physical space of the data protection system 110) |
| Data garbage collection status | indicating the data garbage collection status (if the data protection system 110 has a function of data garbage collection), for example, a status of the garbage collection that is currently performed, a status of needing garbage collection, and the like |
| Time since the last data garbage collection | reflecting how long the data garbage collection has not been performed in the data protection system 110 |
| Amount of protected data | indicating an amount of user data protected in the data protection system 110 (since the user data are typically stored into the data protection system 110 after being subjected to the operations such as de-duplication, compression, and the like, the amount of the protected data is probably greater than the amount of data actually stored in the data protection system 110) |
| Processor status | indicating a status of a processing device used for performing computing and control functions in the data protection system 110, for example, whether the device is operated normally, whether the device is overloaded, whether it fails, and the like |
| Number of device nodes | indicating the number of device nodes used for performing respective functions in the data protection system 110, including the number of storage nodes (e.g., storage devices), computing nodes (e.g., computing devices), and the like |
| Hardware type | indicating types of hardware used in the data protection system 110, including types of respective storage devices, computing devices, network connection devices, and the like |
| Network connection status | indicating a networking status of the data protection system 110 |

It would be appreciated that Table 1 only lists some example system status information. Any other available information indicating the status of the data protection system may also be employed. Furthermore, it is to be understood that although several types of context information has been discussed, one or more types of the context information discussed above may be used in practice, according to the requirements and availability of the information.

After obtaining the context information, at 220, the management device 130 determines, based on the acquired context information, a type of the error in the data protection system 110 from a plurality of predetermined types using the trained deep learning model 132. At 230, the management device 130 provides the determined type of the error in the data protection system 110.

The deep learning model 132 may be configured to receive the context information as a model input, and provide a class of the input. As a result, the deep learning model 132 may be regarded as a deep learning-based classifier. At the training stage, the deep learning model 132 is trained using training context information and labels about ground-truth types of errors associated with the training context information, such that the deep learning model 132 can learn, from the training data, associations between the context information and the types of the errors. The training context information may include context information recorded when errors occur in one or more data protection systems, and the associated labels on the ground-truth types of the errors may be classes of errors after being processed (for example, processed manually).

For the purpose of model training, the training context information may include context information when different types of errors occur such that the deep learning model 132 can learn enough knowledge about the different types of errors. In some embodiments, the training context information may also include context information when no error occurs in the data protection system, enabling the deep learning model 132 to better differentiate between the errors and the normal condition.

The deep learning model 132 may be trained for the plurality of potential and predetermined types of errors. The output of the deep learning model 132 may be one of the predetermined types. The types of the errors may be divided into an error related to a system operating environment and an error in a data protection application. The error related to the system operating environment indicates that an error occurs in some hardware, services or parameter configurations for supporting operation of the data protection system 110. This type of error may be, for example, solved through device replacement, configuration adjustment, or the like. The error in the data protection application indicates a logical error of the data protection application itself, and can be resolved by re-designing application logic at the backend of the system.

In some embodiments, the types of the errors may be subdivided. For example, the error related to the system operating environment may be subdivided into a hardware error, a system parameter configuration error, a network connection error, and/or an error related to a third-party service of the data protection system, and the like. The hardware error refers to failure of certain hardware in the data protection system 110, which may require hardware repair or replacement. The system parameter configuration error refers to one or more configurable parameters in the data protection system 110 being set incorrectly, causing the data protection system 110 unable to operate normally. The network connection error refers to one or more device nodes in the data protection system 110 or one or more ports of the device failing to be connected correctly. The error related to a third-party service refers to a scenario where if a third-party service needs to be introduced into the data protection system 110, the data protection system 110 fails to have successful access to the service due to an error or failure of the third-party service. In this case, it is required to contact with the third-party service provider to fix the bug.

In some embodiments, in addition to the error types as mentioned above, the plurality of predetermined types may also include an type of unknown error which indicates that it is unable to determine the type of the error based on current context information, and/or may include a type of normal operation which indicates a normal operational status of the data protection system 110 as no error occurs. The later type of error probably results from a misreport by a user or false triggering by some error triggering mechanism. In this case, there is no need to take any specific measure.

Figure 3:
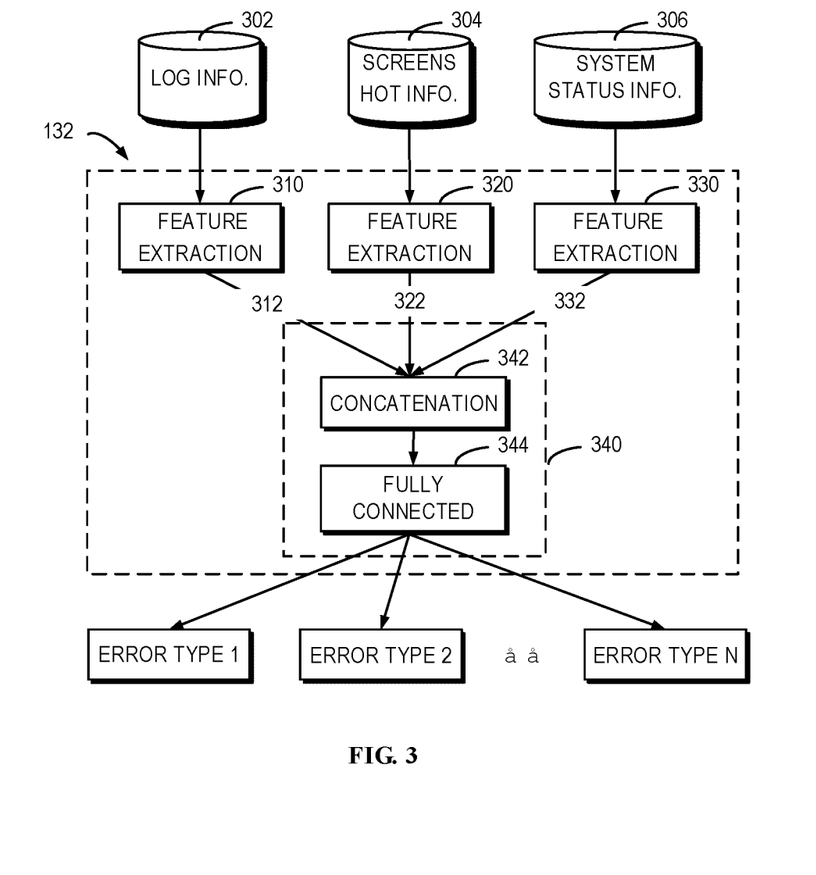
FIG. 3 illustrates an example block diagram of architecture of a deep learning model for error evaluation according to some embodiments of the present disclosure.

Since there may be various context information input into the deep learning model 132 for processing, the deep learning model 132 may be configured with different feature extraction parts for processing different types of context information, in order to better process the different types of context information. FIG. 3 illustrates example architecture of the deep learning model 132 according to some embodiments of the present disclosure.

As shown in FIG. 3, the deep learning model 132 includes feature extraction parts 310, 320, and 330 for extracting feature representations 312, 322 and 332 of log information 302, screenshot information 304, and system status information 306, respectively. A feature representation may be a vectorized representation of the corresponding information. Through training, the respective feature extraction parts can extract and process information features that are useful for determining a type of an error type from the context information in the subsequent stage of error evaluation.

In particular, since the log information 302 may be information of a sequential type, the feature extraction part 310 may be configured to adaptively process sequential information and extract a feature representation from the sequential information. In some embodiments, if respective events recorded in the log information have not been converted into event codes, event code conversion may be performed first. Therefore, each log in the log information can be converted into an event code array which includes respective event codes occurring at respective time points. If the data protection system 110 includes a new type of event, the new type of event may be assigned with a respective event code. In some embodiments, the feature extraction part 310 may include an embedding layer for converting the log information (for example, the converted event code array, which is typically an index in form of positive integer) in to a dense vector with a fixed size. In some embodiments, the feature extraction part 310 may be based on deep learning model architecture adapted to process sequential information, such as a Long Short-Term Memory (LSTM) model structure, Recursive Neural Network (RNN) architecture, and the like. Other types of model structures are also feasible.

Since the screenshot information 304 is typically a two-dimensional image, in some embodiments, the feature extraction part 320 may be implemented using a Convolutional Neural Network (CNN) model structure which has an excellent performance in image processing. CNN is a feed-forward neural network which is typically comprised of one or more convolutional layers, one or more pooling layers, and one or more fully connected layers. CNN has many variants which can be all used to process the screenshot information 304. CNN may efficiently extract image features useful for error classification from the full image. In some embodiments, the size of the screenshot information 304 may be adjusted to a predetermined size and then provided to CNN for processing. It would be appreciated that in addition to CNN, other model structures suitable for processing image data may also be used to implement the feature extraction part 320.

Since various types of information included in the system status information 306 is mainly classification information (e.g., information indicating various statuses) and numerical information (e.g., information indicating various proportions), in some embodiments, the feature extraction part 330 for processing the system status information 306 may be a Multilayer Perceptron (MLP)-based model structure. MLP is a neural network for model identification and classification. MLP includes multiple processing layers (or network layers), where adjacent network layers may be fully connected to each other (i.e., each processing unit, also referred to as a neuron, in the preceding layer is connected to all processing units in the following layer). Each processing unit processes the received input based on a respective activation function which, for example, may be a sigmoid function, tanh function, ReLU function, and the like. It would be appreciated that except for MLP, other model structures suitable for processing classification and numerical information may also be used to implement the feature extraction part 330.

Although FIG. 3 illustrates different feature extraction parts for three different types of context information, there may be more, fewer, or different feature extraction parts according to the types of the context information concerned in practice. It would be appreciated that even though the deep learning model 132 is configured with feature extraction parts capable of processing the different types of context information, according to the different types of the collectable context information, one or more feature extraction parts therein may not operate (i.e., if there is no the corresponding type of context information) in each application.

Since feature representations 312, 322 and 332 extracted by the feature extraction parts 310, 320 and/or 330 are provided to a model part 340 for feature fusion. The model part 340 is configured to determine the type of the error in the data protection system 110 based on the feature information from the different sources. The model part 340 may include a concatenation layer 342 for concatenating the feature representations 312, 322, and 332 extracted by the feature extraction parts 310, 320, and/or 330, to obtain a concatenated feature representation. For example, if the feature representations 312, 322, and 332 are vectors with x, y and z dimensions, respectively, the concatenation layer 342 may concatenate these feature representations as a vector with a (x+y+z) dimension. The model part 340 may include one or more fully connected layers 344 for determining the type of the error in the data protection system 110 based on the feature representation concatenated by the concatenation layers 340. The determined type, for example, may be one of error types 1, 2, . . . , N, where N is an integer equal to or greater than 2. It would be appreciated that the model part 340 may include other types of network layers or other number of fully connected layers for implementing error classification. The embodiments of the present disclosure are not limited in this regard.

The type of the determined error by the deep learning model 132 may, for example, be provided by the manage device 132 or provided to other devices, so as to present the determination about the type to an admin user (such as technical maintenance staff of the data protection system 110). According to the type of the error, the admin user can quickly determine a measure against the error.

Figure 4:
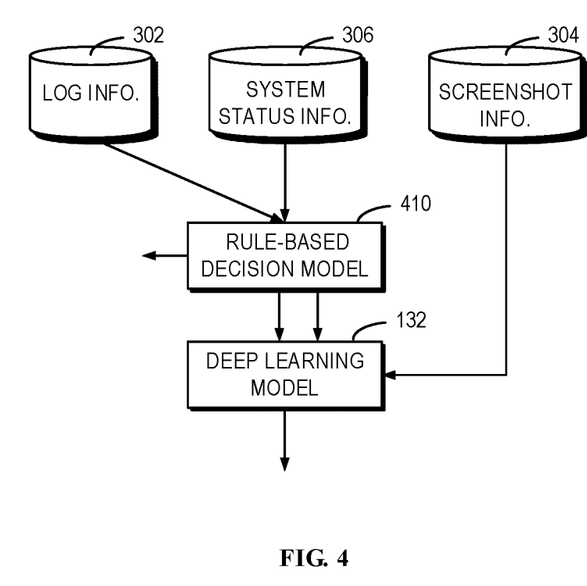
FIG. 4 illustrates a block diagram of an example for implementing error evaluation using a rule-based decision model and a deep learning model according to some embodiments of the present disclosure.

In some embodiments, since it takes a lot of processing, computing and/or storage resources to utilize the deep learning model 132, the management device 130 may execute some preliminary processing on error evaluation using a rule-based decision model to save the resources. FIG. 4 illustrates an example according to those embodiments. As shown in FIG. 4, the management device 130 executes error evaluation by means of a rule-base decision model 410 and the deep learning model 132.

The context information, in particular the log information 302 and the system status information 306, may be first provided to the rule-based decision model 410. The rule-base decision model 410 is configured to perform the error evaluation based on one or more predefined rules. If one or more predefined rules for a certain type are met, it can be determined that the error in the data protection system 110 belongs to the certain type. More specifically, the rule-based decision model 410 determines, based on the log information 304 and the system status information, whether one or more predefined rules are met. For example, if it is determined from the log information 304 and/or the system status information 306 that there is no network connection between the client device 120 and the data protection system 110, the rule-based decision model 410 can determine that the type of the error is a network connection error. If the rule-based decision model 410 cannot determine the type of the error on the basis of the current rules, the log information 302 and the system status information 306 are further provided to the deep learning model 132. Since the rule-based decision model 410 is unable to process image information for visual presentation, the screenshot information 304 may not be provided to the rule-based decision model 410.

The rules in the rule-based decision model 410 are typically set empirically by those skilled in the art, and the number of the rules is generally limited. The concerned rules may be organized as the rule-based decision model 410 in the form of hardcode. Hence, the rule-based decision model 410 may quickly make a simple decision. This is advantageous for quick processing of some simple and direct errors, without operating the more complicated deep learning model 132.

However, since more complicated error evaluation cannot be performed in light of the rule-based determination, the management device 130 utilizes the deep learning model 132 to further process the context information such as the log information 302, the screenshot information 304, the system status information 306, and the like, to further determine the type of the error, when the rule-based decision model cannot determine the type of the error in the data protection system.

In some embodiments, after being applied in the application stage, the deep learning model 132 may also be improved continuously. For example, with the application and the improvement of the data protection system 110, a new type of error may occur which is not evaluated before. In some embodiments, if there is a potential that a new type of error may occur in the data protection system, the deep learning model 132 may be re-trained for the plurality of predetermined types and the new type such that the deep learning model 132 is capable of determining the new type of error in the context information related to the data protection system 110. In this way, the error evaluation capability of the deep learning model 132 can be improved continuously. Training or re-training of the deep learning model 132 may be implemented by one or more computing devices having a powerful computing capability, or may be implemented at the management device 130. The embodiments of the present disclosure are not limited in the aspect.

Figure 5:
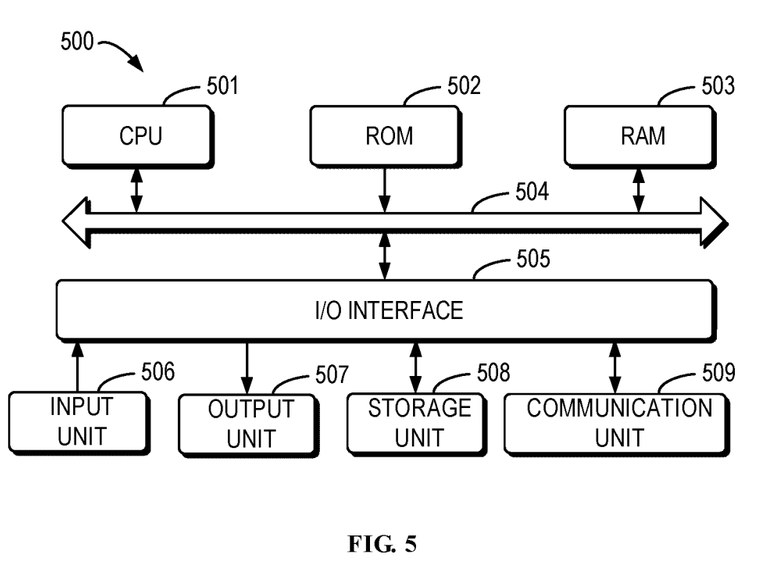
FIG. 5 illustrates a block diagram of an example device that can be used to implement the embodiments of the present disclosure.

FIG. 5 illustrates a block diagram of an example device 500 that can be used to implement the embodiments of the present disclosure. The device 500 may be implemented as or included in the management device 130 in FIG. 1.

As shown, the device 500 includes a central processing unit (CPU) 501, which can perform various suitable acts and processing according to computer program instructions stored in a read-only memory (ROM) 502 or loaded to a random-access memory (RAM) 503 from a storage unit 508. The RAM 503 can also store various programs and data required by the operations of the device 500. The CPU 501, ROM 502, and RAM 503 are connected to each other via a bus 504. An input/output (I/O) interface 505 is also connected to the bus 504.

The following components in the device 500 are connected to an I/O interface 505: an input unit 506 such as a keyboard, mouse, and the like; an output unit 507 including various kinds of displays and loudspeakers etc.; a storage unit 508 including a disk and optical disk, etc.; and a communication unit 509 such as a network card, modem, wireless transceiver and the like. The communication unit 509 allows the device 500 to exchange information/data with other devices via a computer network, such as the Internet, and/or various telecommunication networks.

Various methods and processes described above, such as the process 200, can also be performed by the processing unit 501. In some embodiments, the process 200 can be implemented as a computer software program or a computer program product tangibly included in the machine-readable medium, such as a non-transient computer readable medium, e.g., storage unit 508. In some embodiments, the computer program can be partially or fully loaded and/or mounted to the device 500 via the ROM 502 and/or the communication unit 509. When the computer program is loaded to the RAM 503 and executed by the CPU 501, one or more steps of the above described process 200 can be implemented. Alternatively, the CPU 501 can be configured via any other suitable manners (e.g., by means of firmware) to execute the process 400 and/or process 500 in other embodiments.

Those skilled in the art would understand that various steps of the method of the disclosure may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the device have been mentioned in detailed description above, such partition is only an example, without limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method for error evaluation, comprising:
in accordance with a determination that an error occurs in a data protection system, obtaining context information related to an operation of the data protection system, wherein the context information comprises screenshot information for a user interface of a client device of the data protection system when the error occurs;
determining, based on the context information and using a trained deep learning model, a type of the error in the data protection system from a plurality of predetermined types, the deep learning model being trained based on training context information and a label on a ground-truth type of an error associated with the training context information; and
providing the type of the determined error in the data protection system.

2. The method of claim 1, wherein the context information further comprises at least one of the following types of information:
log information of the data protection system, the log information indicating events occurring in the data protection system recorded according in a temporal sequence; or
system status information of the data protection system.

3. The method of claim 2, wherein the system status information indicates at least one of the following:
an usage rate of a total storage space of the data protection system,
an usage rate of a storage capacity allocated to a user of the data protection system,
an usage rate of an operating system of the data protection system,
an usage rate of a memory space of the data protection system,
a text system status of the data protection system,
a data garbage collection status of the data protection system,
a time duration since last data garbage collection of the data protection system,
an amount of protected data of the data protection system,
a processor status of the data protection system,
a number of device nodes in the data protection system,
a hardware type in the data protection system, or
a network connection status of the data protection system.

4. The method of claim 2, wherein determining the type of the error in the data protection system comprises:
performing at least one of the following:
extraction of a first feature representation of the log information using a first feature extraction part of the deep learning model trained for processing a type of log information,
extraction of a second feature representation of the screenshot information using a second feature extraction part of the deep learning model trained for processing a type of screenshot information, or
extraction of a third feature representation of the system status information using a third feature extraction part of the deep learning model trained for processing a type of system status information; and
determining, based on at least one of the extracted first feature representation, second feature representation and third feature representation, the type of the error in the data protection system using a model part of the deep learning model trained for feature fusion.

5. The method of claim 4, wherein determining the type of the error in the data protection system comprises performing the extraction of the second feature representation of the screenshot information using the second feature extraction part of the deep learning model trained for processing the type of screenshot information, and
wherein the second feature extraction part of the deep learning model comprises a Convolutional Neural Network (CNN) model structure configured to extract image features from an image associated with the screenshot information.

6. The method of claim 1, wherein determining the type of the error in the data protection system comprises:
determining whether a rule-based decision model is capable of determining a type of the error in the data protection system from the context information; and
in accordance with a determination that the rule-based decision model cannot determine a type of the error in the data protection system, determining the type of the error in the data protection system using the deep learning model.

7. The method of claim 1, wherein the deep learning model is re-trained for the plurality of determined types and a new type of error in accordance with a determination of a potential occurrence of the new type of error in the data protection system, such that the deep learning model is capable of determining the new type of error from context information related to the data protection system.

8. The method of claim 1, wherein the plurality of predetermined types comprise one or more of the following types of errors: a hardware error, a system parameter configuration error, a network connection error, an error related to a third-party service of the data protection system, and an error in a data protection application.

9. The method of claim 1, wherein the screenshot information comprises a screenshot of a graphical user interface (GUI) of the client device of the data protection system when the error occurs.

10. An electronic device, comprising:
a processor; and
a memory coupled to the processor, the memory storing instructions to be executed, the instructions, when executed by the processor, causing the electronic device to perform acts of:
in accordance with a determination that an error occurs in a data protection system, obtaining context information related to an operation of the data protection system, wherein the context information comprises screenshot information for a user interface of a client device of the data protection system when the error occurs;
determining, based on the context information and using a trained deep learning model, a type of the error in the data protection system from a plurality of predetermined types, the deep learning model being trained based on training context information and a label on a ground-truth type of an error associated with the training context information; and
providing the determined type of the error in the data protection system.

11. The electronic device of claim 10, wherein the context information further comprises at least one of the following types of information:
log information of the data protection system, the log information indicating events occurring in the data protection system recorded according in a temporal sequence; or
system status information of the data protection system.

12. The electronic device of claim 11, wherein the system status information indicates at least one of the following:
an usage rate of a total storage space of the data protection system,
an usage rate of a storage capacity allocated to a user of the data protection system,
an usage rate of an operating system of the data protection system,
an usage rate of a memory space of the data protection system,
a text system status of the data protection system,
a data garbage collection status of the data protection system,
a time duration since last data garbage collection of the data protection system,
an amount of protected data of the data protection system,
a processor status of the data protection system,
a number of device nodes in the data protection system,
a hardware type in the data protection system, or
a network connection status of the data protection system.

13. The electronic device of claim 11, wherein determining the type of the error in the data protection system comprises:
performing at least one of the following:
extraction of a first feature representation of the log information using a first feature extraction part of the deep learning model trained for processing a type of log information,
extraction of a second feature representation of the screenshot information using a second feature extraction part of the deep learning model trained for processing a type of screenshot information, or
extraction of a third feature representation of the system status information using a third feature extraction part of the deep learning model trained for processing a type of system status information; and
determining, based on at least one of the extracted first feature representation, second feature representation and third feature representation, the type of the error in the data protection system using a model part of the deep learning model trained for feature fusion.

14. The electronic device of claim 13, wherein determining the type of the error in the data protection system comprises performing the extraction of the second feature representation of the screenshot information using the second feature extraction part of the deep learning model trained for processing the type of screenshot information, and
wherein the second feature extraction part of the deep learning model comprises a Convolutional Neural Network (CNN) model structure configured to extract image features from an image associated with the screenshot information.

15. The electronic device of claim 10, wherein determining the type of the error in the data protection system comprises:
determining whether a rule-based decision model is capable of determining a type of the error in the data protection system from the context information; and
in accordance with a determination that the rule-based decision model cannot determine a type of the error in the data protection system, determining the type of the error in the data protection system using the deep learning model.

16. The electronic device of claim 10, wherein the deep learning model is re-trained for the plurality of determined types and a new type of error in accordance with a determination of a potential occurrence of the new type of error in the data protection system, such that the deep learning model is capable of determining the new type of error from context information related to the data protection system.

17. The electronic device of claim 10, wherein the plurality of predetermined types comprise one or more of the following types of errors: a hardware error, a system parameter configuration error, a network connection error, an error related to a third-party service of the data protection system, and an error in a data protection application.

18. The electronic device of claim 10, wherein the screenshot information comprises a screenshot of a graphical user interface (GUI) of the client device of the data protection system when the error occurs.

19. A computer program product being tangibly stored on a non-transitory computer readable medium and comprising computer-executable instructions which, when executed, cause a processor to perform operations, the operations comprising:
in accordance with a determination that an error occurs in a data protection system, obtaining context information related to an operation of the data protection system, wherein the context information comprises screenshot information for a user interface of a client device of the data protection system when the error occurs;

determining, based on the context information and using a trained deep learning model, a type of the error in the data protection system from a plurality of predetermined types, the deep learning model being trained based on training context information and a label on a ground-truth type of an error associated with the training context information; and providing the type of the determined error in the data protection system.

20. The computer program product of claim 19, wherein the context information comprises at least one of the following types of information:

log information of the data protection system, the log information indicating events occurring in the data protection system recorded according in a temporal sequence; or system status information of the data protection system.

* * * * *